United States Patent
Mutka et al.

(10) Patent No.: US 8,966,252 B2
(45) Date of Patent: Feb. 24, 2015

(54) PRIVATE ENTITY AUTHENTICATION FOR PERVASIVE COMPUTING ENVIRONMENTS

(75) Inventors: Matt W. Mutka, Okemos, MI (US); Feng Zhu, Issaquah, WA (US); Lionel Ni, Kowloon (HK)

(73) Assignee: Board of Trustees of Michigan State University, East Lansing, MI (US)

( * ) Notice: Subject to any disclaimer, the term of this patent is extended or adjusted under 35 U.S.C. 154(b) by 1917 days.

(21) Appl. No.: 12/075,618

(22) Filed: Mar. 12, 2008

(65) Prior Publication Data
US 2008/0229103 A1 Sep. 18, 2008

Related U.S. Application Data

(60) Provisional application No. 60/906,860, filed on Mar. 13, 2007.

(51) Int. Cl.
*G06F 21/10* (2013.01)
*H04L 29/06* (2006.01)
*H04L 9/32* (2006.01)

(52) U.S. Cl.
CPC .............. *H04L 63/08* (2013.01); *H04L 63/083* (2013.01); *H04L 63/0876* (2013.01); *H04L 9/32* (2013.01)
USPC ................................ 713/168; 726/27; 726/30

(58) Field of Classification Search
USPC ............................. 713/168–169; 726/4, 26–30
See application file for complete search history.

(56) References Cited

U.S. PATENT DOCUMENTS

| | | | | |
|---|---|---|---|---|
| 6,014,669 A | * | 1/2000 | Slaughter et al. | 707/610 |
| 8,711,843 B2 | * | 4/2014 | Rossi | 370/352 |
| 8,819,415 B2 | * | 8/2014 | Choi et al. | 713/155 |
| 2002/0146125 A1 | * | 10/2002 | Eskicioglu et al. | 380/255 |
| 2003/0051140 A1 | * | 3/2003 | Buddhikot et al. | 713/169 |
| 2003/0115485 A1 | * | 6/2003 | Milliken | 713/201 |
| 2004/0111608 A1 | * | 6/2004 | Oom Temudo de Castro et al. | 713/156 |
| 2005/0220095 A1 | * | 10/2005 | Narayanan et al. | 370/389 |
| 2007/0100701 A1 | * | 5/2007 | Boccon-Gibod et al. | 705/21 |
| 2008/0263647 A1 | * | 10/2008 | Barnett et al. | 726/6 |

* cited by examiner

*Primary Examiner* — Michael Pyzocha
*Assistant Examiner* — Phy Anh Vu
(74) *Attorney, Agent, or Firm* — Harness, Dickey & Pierce, P.L.C.

(57) ABSTRACT

A method is provided for authenticating an entity having a plurality of keys in a digital form residing on a claimant computing device. The method comprises: generating a first code word by applying a hash function to a first key residing on the claimant computing device; encoding the first code word into an array of bits having a Bloom filter format; generating a second code word by applying a hash function to a second key residing on the claimant computing device; encoding the second code word into the array of bits; and broadcasting an authentication message having the array of bits therein from the claimant computing device.

19 Claims, 6 Drawing Sheets

| Msg No. | Sndr/Rcvr | Message |
|---|---|---|
| 1 | M→L: | $BF_M(R_M, t_M, S_{Unique}), R_M, t_M$ |
| 2 | L→M: | $R_M, t_M, MB_L, R_L, t_L, Hash_L(R_M, t_M, S_{Unique})$ |
| 3 | M→L: | $R_L, t_L, Hash_M(R_L, t_L, S_{Unique})$ |

Figure - 5A

| Msg No. | Sndr/Rcvr | Message |
|---|---|---|
| 1 | M→L: | $BF_M(R_M, t_M, S_{PlainText}), R_M, t_M$ |
| 2 | L→M: | $R_M, t_M, MB_L, R_L, t_L, Hash_L(R_M, t_M, S_{Group})$ |
| 3 | M→L: | $R_L, t_L, Hash_M(R_L, t_L, S_{Group})$ |

Figure - 5B

| Msg No. | Sndr/Rcvr | Message |
|---|---|---|
| 1 | M→L: | $BF_M(R_M, t_M, S_{domain}), R_M, t_M$ |
| 2 | L→M: | $R_M, t_M, MB_L, Hash_L(R_M, t_M, S_{domain})$ $(Hash_L(R_M, t_M, S_{domain}))_{KL}{}^{-1}, BF_L(R_L, t_L, S_{individual}), R_L, t_L$ |
| 3 | M→L: | $R_L, t_L, MB_M, Hash_M(R_L, t_L, S_{individual})$ |

Figure - 5C

PRIVATE ENTITY AUTHENTICATION FOR PERVASIVE COMPUTING ENVIRONMENTS

GOVERNMENT CLAUSE

This invention was made with government support under OCI0334035 awarded by the National Science Foundation. The government has certain rights in the invention.

CROSS-REFERENCE TO RELATED APPLICATIONS

This application claims the benefit of U.S. Provisional application Ser. No. 06/906,860, filed on Mar. 13, 2007. The disclosure of the above application is incorporated herein by reference.

FIELD

The present disclosure relates to an entity authentication system and method that employ a master digital access key.

BACKGROUND

People prove their identities everyday by showing the possession of access tokens. Using a key to open a lock may be the most common form. As one may access many locks, traditional master keys were designed to enable accessing multiple locks with a single key. Nevertheless, master keys are not widely used. Instead, people carry multiple access tokens for entity authentications, for example, keys, magnetic stripe cards, smart cards, RFID tags, and other tokens.

Traditional master keys are convenient. One does not need to carry many keys and memorize relationships between keys and locks. However, traditional master keys have fatal problems that are not suitable for everyone's daily usage. For example, the delegation of a master key equals delegating access to all locks that one has privilege to access. Revocation of a master key is costly because the locks that the master can open and the keys of other owners need to be replaced. In addition, if an intruder acquires a master key, then the intruder may open many locks. Moreover, locks that support master keys are vulnerable to the malicious insider who has a normal key.

The use of multiple access tokens does not have the fatal delegation and revocation problems as traditional master keys have because one token usually matches one lock. If a key-lock pair is compromised, it does not put other locks at risk. Issues of delegation and revocation are better addressed by replacing keys with modern access tokens, for instance, a hotel room key in the form of a magnetic stripe card or a smart card. With the encoding of privileges within a digital form, the delegation and revocation of the privileges are done on the computers at the front desks. Moreover, modern access tokens improve usability in a wide variety of applications, for example, unlocking a car using a remote control; accessing an enterprise facility using a smart card badge; entering a parking facility using a RFID gate card; opening a hotel room using a magnetic stripe card; or locking and unlocking a computer by wearing a token. Additional token designs are emerging as well as their applications. Nevertheless, the management of access tokens and memorizing the token-lock relationships become inconvenient and difficult as the number of tokens increases.

In pervasive computing environments, entity authentications might be ubiquitously necessary. There is a need for a way to achieve both the advantages of traditional master keys and multiple access tokens while avoiding their disadvantages. The teachings of the present disclosure fulfill this need.

SUMMARY

A method is provided for authenticating an entity having a plurality of keys in a digital form residing on a claimant computing device. The method comprises: generating a first code word by applying a hash function to a first key residing on the claimant computing device; encoding the first code word into an array of bits having a Bloom filter format; generating a second code word by applying a hash function to a second key residing on the claimant computing device; encoding the second code word into the array of bits; and broadcasting an authentication message having the array of bits therein from the claimant computing device.

Further areas of applicability will become apparent from the description provided herein. It should be understood that the description and specific examples are intended for purposes of illustration only and are not intended to limit the scope of the present disclosure.

DRAWINGS

FIGS. 5A-5C are sequence charts depicting authentication procotols for different types of key-lock relationships.

The drawings described herein are for illustration purposes only and are not intended to limit the scope of the present disclosure in any way.

DETAILED DESCRIPTION

The master digital access key is a novel approach for digital access tokens to have the advantages of master keys and multiple access tokens. The master digital access key aggregates the digital forms of all access tokens that its owner has. The tokens on the master digital access key and their respective locks maintain their original relationships (one token matches one lock). Therefore, the advantages of using multiple access tokens are retained. This approach properly selects access tokens for entity authentications and therefore achieves the convenience of traditional master keys. Keys may also be referred to as digital access tokens and locks as target resources. Throughout this disclosure, the term key is used to refer to a digital access token and a lock is used to refer to a network resource or a digital lock.

Figure 1:
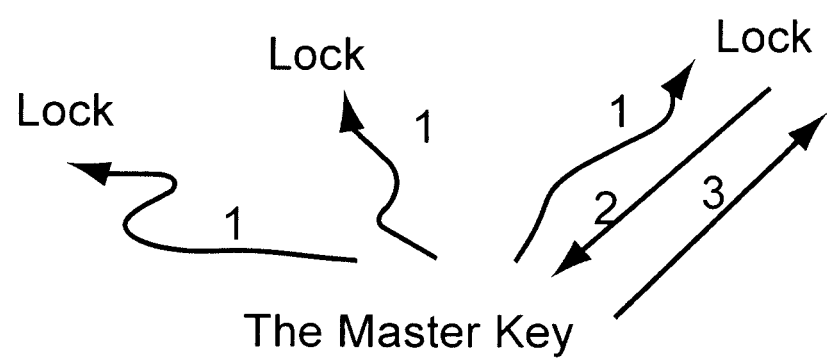
FIG. 1 is a diagram depicting an authentication process.

With reference to FIG. 1, the authentication process is invoked when a key owner pushes a lock or unlock button on a claimant computing device. The claimant computing device houses a master digital access key. The claimant computing device initiates the authentication process by sending a broadcast message which queries any locks in the vicinity of the claimant computing device. Each lock that receives the broadcast message tries to authenticate the sender. Since the master digital access key aggregates digital keys of a user, it needs to find the right key to operate a lock. If a lock does not find itself in the set of keys embedded in the master digital access key, it keeps silent; otherwise, the lock responds and sends its challenge. The master digital access key in turn responds and supplies a key to operate the lock. It is envisioned that multiple locks can reply back. If any response is not correct, the master digital access key or the lock terminates the authentication process. In this process, the master digital active access key takes an active approach.

If the master digital access key is reactive, it waits for locks to send challenges. When a lock sends a challenge together with its identity, the master digital access key knows which key to use. Reactive is not selected as the master digital access key's preferred operating status, unless another factor (such as its owner) ensures that the master digital access key is in the proximity of the intended and legitimate lock. In addition, the reactive master digital access key requires all the locks to frequently send challenges. Locks that use batteries such as remote keyless entry systems on cars may not be able to afford the expense of frequently sending messages. During either of these operating modes, the master digital access key is intended to address the following issues.

Privacy information includes the key owners' credentials and their presence information. Most security protocols only protect sensitive information from outsiders but not from insiders. However, the concern of privacy may be very important among insiders, namely the concerns among key owners or between a key owner and a lock. For instance, if Bob accesses a health club gym using a key (digital key), he may worry that others who go to the same gym use the knowledge of that key to track him or are able to determine that he goes to places other than the gym. For situations when the exposure of presence information is unnecessary, the master digital access key may be designed to protect privacy information from both insiders and outsiders.

Typically, one may interact with many locks, and a lock may interact with many key owners. During lock discovery using the master digital access key, one may specify hundreds of potential locks and a lock may specify hundreds of potential key owners within one network packet. The master digital access key supports different key-lock relationships. In addition, each key-lock pair may also decide their own preference regarding the amount of overhead incurred for lock operations or privacy protection. As further described below, exemplary master digital access key protocols require only three messages to discover locks, identify a key owner, and complete mutual authentication.

Figure 2:
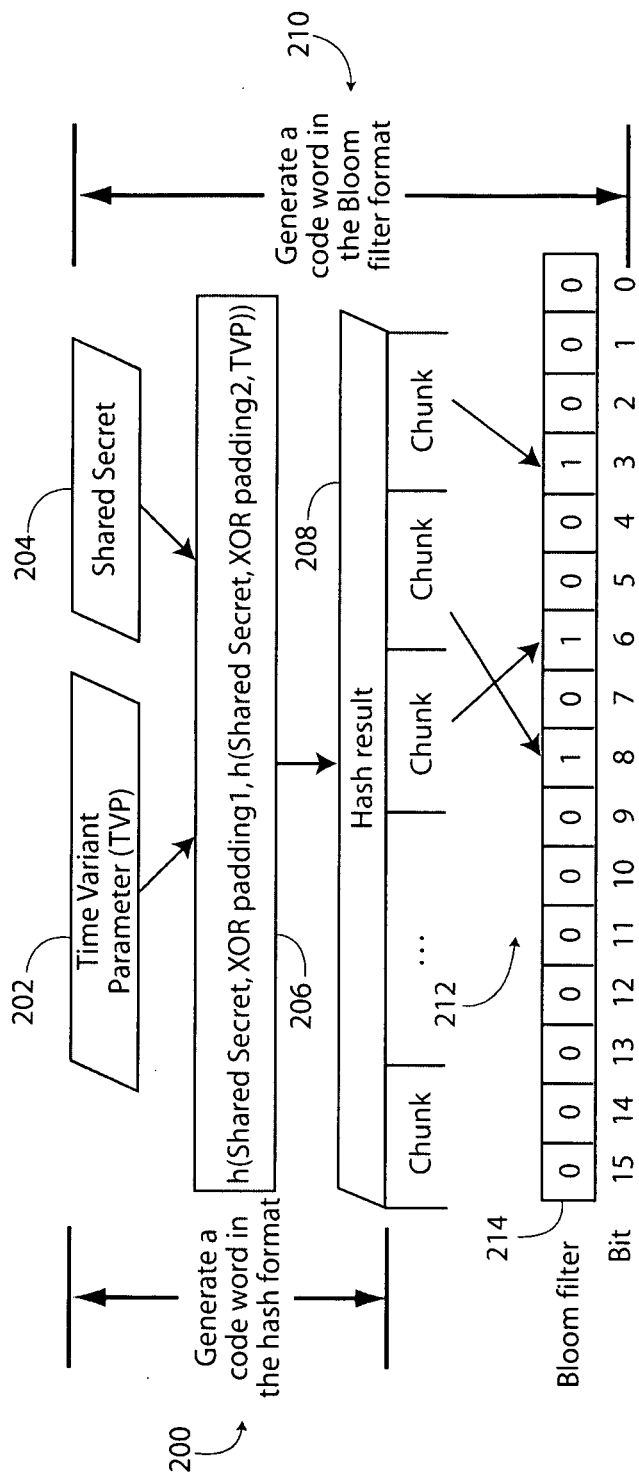
FIG. 2 is a diagram illustrating an exemplary technique for constructing a master digital access key.

An exemplary technique for constructing a master digital access key is further described in relation to FIG. 2. In the exemplary embodiment, the authentication process exchanges only code words. A code word is calculated from a shared secret between the master digital access key and lock. Since only a party who knows the shared secret understands a code word, identifications are protected from being exposed to outsiders. Thus, private authentication is achieved. While the following description makes reference to code words being derived from keys, it is understood that code words may be derived from other types of shared secrets.

Code words in this design have two formats: the hash format and the Bloom filter format. The hash format is used when the key and lock have a one-to-one relation, for example after the master digital access key has discovered the target lock. The Bloom filter format is used when keys and locks have one-to-many relationships. For instance, the master digital access key queries a set of potential locks, or a lock needs to identify a key owner among many key owners.

The top half 200 of FIG. 2 illustrates the generation of a code word in a hash format. In this exemplary embodiment, the code word is derived from a shared secret (key) 204, and a time variant parameter (TVP) 202, where the TVP may include a timestamp and a random number. It is also contemplated that the code word may be derived only from the shared secret without the use of a time variant parameter. To generate a code word, the key is appended to the time variant parameter and a hash function 206 is applied thereto. It is envisioned that different types of hash functions, such as MD5 or SHA-1, may be used. The pre-image resistance and collision resistance properties of hash functions ensure that it is computationally difficult to find the shared secret 204 from the hash result 208. Moreover, it is envisioned that other techniques may be used to generate a code word.

To generate a code word in a Bloom filter format 210, a hash result 208 is first generated in the manner set forth above. The hash result 208 is further separated into chunks as shown at 212. The size of the chunks depends on the length of the Bloom filter 214, which is an array of $2^X$ bits. To fit within a network packet, the Bloom filter 214 is equal to or less than $2^{13}$=8192 bits. If Bloom filters longer than a network packet are used, compression can be applied to them to make the compressed version fit into a network packet. In the case the Bloom filter is $2^{13}$ bits, each chunk size is set at 13 bits. Since the hash result 208 is 128 bits for MD5 and 160 bits for SHA-1, a hash result 208 is separated into at least 10 chunks. To encode the code word into the array of bits, all bits in a Bloom filter 214 are initially set to zero. The value of a chunk serves as an index to a Bloom filter 214 and the corresponding bit is set to one. For example, a chuck having four bits will map to 16 bits of the Bloom Filter. If the chuck has a value of 8, then the $8^{th}$ bit in this subset of bits is set to one. In FIG. 2, bits 8, 6, and 3 represent the code word. Thus, a code word is represented by a combination of several bits that are indexed by the chunks. While Bloom filters are the preferred approach, other techniques for encoding a code word (or hash results thereof) into an array of bits are contemplated by this disclosure.

For all potential locks that the master digital access key wants to discover, it repeats the above process for each key. The process uses the same time variant parameter as was used for the first key. Once all of the keys have been encoded in the Bloom filter, an authentication message comprised of the Bloom filter and the time variant parameter are broadcast by a claimant computing device to query locks in the vicinity. In this way, multiple keys are encoded into a single data packet.

Similarly, if a lock and each of its key owners share a unique secret, the lock may generate code words for all its key owners in a Bloom filter using the same process as described above. The lock may then send the Bloom filter and requests the key owner who sends a discovery message to identify himself.

The probability of finding a hash result from a Bloom filter is $$\frac{1}{\sum_{k=n1}^{n2}\left(\frac{m!}{(m-k)!}\right)}$$

where k is a code word length and m is the number of bits set in a Bloom filter. The denominator is the number of permutations of k bits from m bits, that is, select k bits from m bits and then make arrangements of the k chunks to guess a hash result. If a hacker does not know the length of a code word, he needs to try different code word lengths from n1 to n2. Only part of the hash result might be found if the code word is generated by part of the chunks. Even if the hash result is found, it is still computationally difficult to find the shared secret as in the situation of the hash format code words.

The Bloom filter format of code words is scalable. Hundreds of code words may be expressed in a Bloom filter. For instance, if the master digital access key uses a $2^{13}$-bit Bloom filter, of which 50% are set, and on average each code word is 5 bits, then at least $2^{13} \times 50\% \div 5 = 819$ code words may be set in a discovery message. The result (819 code words) is a lower bound, which is calculated from the extreme case that no two code words set the same bit.

Code word verification in the Bloom filter format is efficient and independent of the number of code words in a Bloom filter. A party calculates the hash results, as discussed above, and then verifies whether the bits indexed by the chunks in a Bloom filter are set to one. If any bit is not one, then the code word does not match. A property of Bloom filters ensures that if two hash results match, the Bloom filter format of the code words match. It is possible that a party may find false positive matches.

Figure 3:
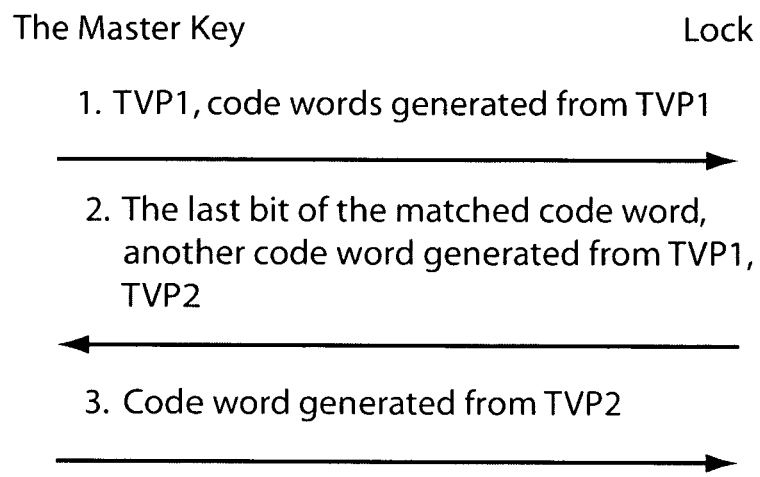
FIG. 3 is a diagram illustrating a generic interaction protocol that achieves secure authentication.

FIG. 3 illustrates a generic protocol that achieves a secure authentication process. The claimant computing device initiates an authentication process by broadcasting an authentication message to discover potential locks. In exemplary embodiment, the authentication message includes an array of bits which encodes all code words along with a corresponding time variant parameter (TVP1).

Upon receipt of an authentication message, a given verifying computing device will use the message to authenticate the claimant computing device. When the code word encoded in the array matches the code word that is generated from the key held by the verifying computing device, a reply message in transmitted from the verifying computing device to the claimant computing device. The reply message provides an indication that the code word was known to the verifying device as well as the basis for another challenge. In an exemplary embodiment, the reply message may include a newly generated time variant parameter (TVP2) which is used to by the claimant computing device to send another code word.

Lastly, the claimant computing device responds to the challenge with a code word generated from the newly generated time variant parameter (TVP2). By decoding the code word, the verifying computing device confirms the identity of the claimant computing device. In the first and second messages, the claimant computing device and the verifying computing device are posting challenges to each other. In the second and third messages, the responding device provides a code word based on the challenges. Thus, mutual authentication is attained.

The total number of bits set in a Bloom filter may be maliciously used as a signature to track or identify a master digital access key owner. To counter the attack, code words and some random bits are mixed together to reach a fixed ratio of the number of bits set and total number of bits in a Bloom filter. Thus, all Bloom filters look the same. Moreover, code word lengths in the Bloom filter format are obscured. A lock only indicates the last bit of the matched code word in its reply message as shown in FIG. 3. Thus, every code word looks the same to an attacker.

Since the authentication process includes discovery of the locks and keys, unnecessary code words may be transmitted. Although the master digital access key and locks exchange code words, insiders understand the code words. In some situations there are privacy concerns among insiders. For example, Bob does not want other gym key owners to use the knowledge of the key for the gym to identity or track him at places other than the gym. To address the problem, Bob's master digital access key may speak a partial code word for the gym door lock in a discovery message (e.g., encode 5 bits of a 10 bit code word in the Bloom Filter). A partial code word causes an insider to be uncertain whether Bob has the gym key. If Bob is not near the gym door, his master digital access key will not receive a reply message from the gym door lock, and thus Bob preserves his privacy. A partial code word increases the number of false positive cases, which for example, the gym's door lock may have communication and computation overhead to interact with some illegitimate key owners. However, illegitimate key owners do not gain access because the code words in the last messages can only be generated by legitimate key owners.

Unlike conventional keys and locks that expose their information in full whenever they are used, a key on the master digital access key and a lock may select the degree of exposure during the challenges and responses. This flexibility enables a key and a lock to decide when to expose and how much to expose. In addition, partial exposure is very useful when discovering locks. If a lock or a key is not present, further exposure can be stopped to avoid unnecessary full exposure. This disclosure focuses on the case that the master digital access key and a lock mutually authenticate each other in three messages. A key and a lock may exchange partial information in many rounds.

On the other hand, there might be no privacy concerns among insiders. For example, Bob and his wife Alice are not concerned that their master digital access keys speak code words for their cars, because only their master digital access keys and cars understand the code words. When there is no privacy concern, a precise code word should be used to avoid unnecessary communication and computation overhead. For example, Bob's master digital access key always speaks a precise code word for his car. It is noteworthy that both precise code words with low false positive rates and partial code words with high false positive rates may be specified in the same Bloom filter. Consequently, the Bloom filter can both protect privacy and avoid unnecessary overhead.

Some mathematical properties of the Bloom filter for the case of the master digital access key are examined. One may find some formal mathematical analysis of the false positive rates and the calculation of the expected false positive rate in: A. Broder and M. Mitzenmacher, "Network Applications of Bloom Filters: A Survey," Internet Mathematics, vol. 1, 2005; and L. Fan, P. Cao, J. Almeida, and A. Broder, "Summary Cache: A Scalable Wide-Area Web Cache Sharing Protocol," IEEE/ACM TRANSACTIONS ON NETWORKING, vol. 8, pp. 281-293, 2000. Unlike the analyses, which are based on having each element in a Bloom filter with the same length, the master digital access key can use various lengths for different code words. Moreover, the master digital access key uses a fixed ratio between the numbers of bits set and the Bloom filter lengths. The false positive rate in this case is a typical sampling with replacement problem. Therefore, the false positive rate at a lock's side is:

$$p(\text{code word match} \mid \text{not key owner}) = \left(\frac{m}{n}\right)^k \quad (1)$$

where n is the Bloom filter length, m is the number of bits set in the Bloom filter, and k is the length of a code word. Thus, given an illegitimate key owner, the false positive rate depends on n, m, and k. The analysis of the false positive rate at the master digital access key's side is similar.

Figure 4:
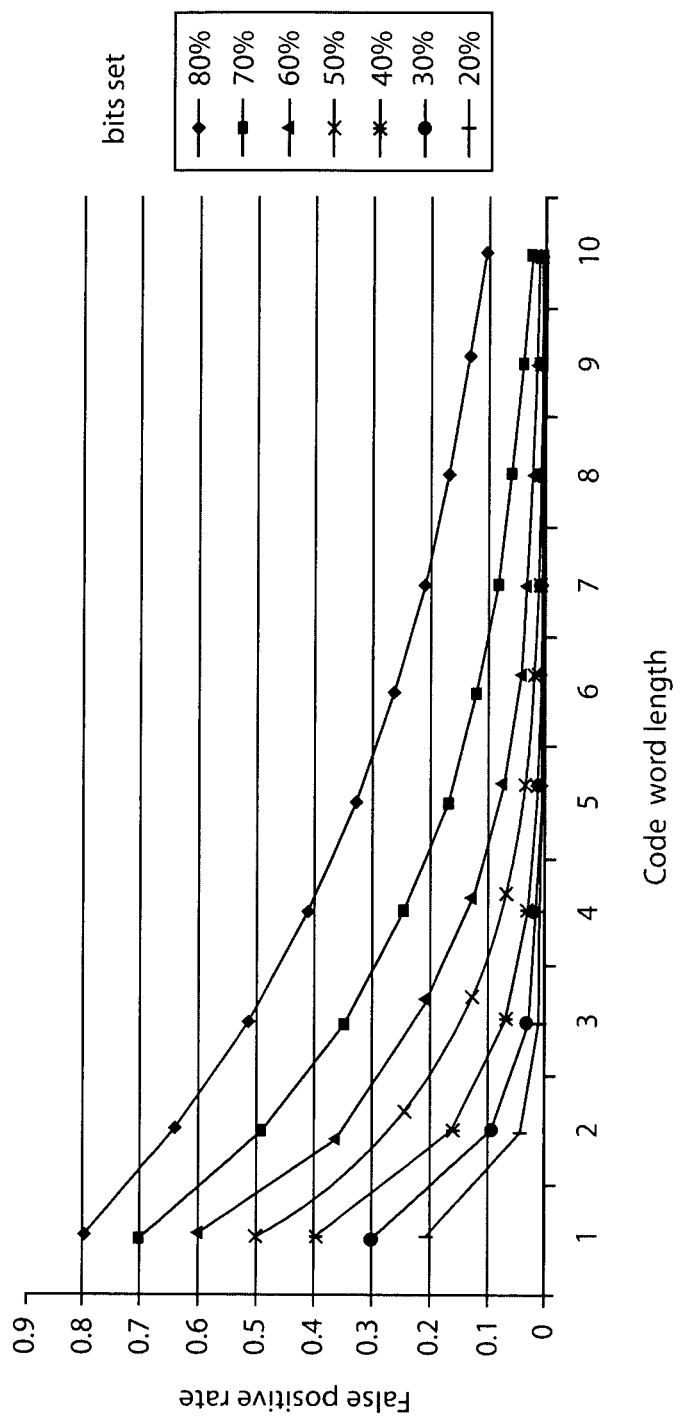
FIG. 4 is a graphical representation illustrating that false positive rates decrease as the length of the code word increases for the authentication process presented in this disclosure.

By examining equation 1, a property that is useful in a master digital access key can be found. When the length of a code word increases and the m/n ratio is fixed, the false positive rate decreases as shown in FIG. 4. For example, if the m/n ratio is at 50%, a code word of 1 bit has a false positive rate of 0.5, a code word of 5 bits has a false positive rate about 0.03, and a code word of 10 bits has a false positive rate less than 0.001. The m/n ratio at around 50% provides a good span of false positive rates for the code words from 1 bit to 10 bits. In an exemplary embodiment, a 50% ratio is used. In summary, if a key-lock pair wants to achieve a low false positive rate, they may exchange more bits (say 10 bits) in a code word. If there are privacy concerns, they may exchange fewer bits (1, 2 or 3 bits) of a code word.

Long code words reduce unnecessary communication and processing overhead. To further reduce unnecessary overhead, another hash algorithm or another secret may be used to generate a code word of 20 bits or longer. Very long code words are useful for applications that require extremely low false positive cases, such as for remote keyless entry systems. The use of partial code words changes the order from having the key owner first expose code words precisely to having locks first expose code words precisely. Precise exposure at a later time has the advantage when privacy is a concern. If there is a mismatch in the code word, a party that exposes later may avoid the exposure. If both a key owner and a lock have privacy concerns, the issue becomes a "chicken-and-egg problem". The progressive approach proposed in F. Zhu, W. Zhu, M. Mutka, and L. Ni, "Expose or Not? A Progressive Exposure Approach for Service Discovery in Pervasive Computing Environments," presented at 3rd IEEE Annual Conference on Pervasive Computing and Communications, Kauai Island, Hi., 2005, can be used. In accordance with this progressive approach, the master digital access key and a lock expose partial information in turn and avoid unnecessary exposure if there is any mismatch. Based on a probability model, the two parties determine the number of bits to exchange in each round and how to verify the other party's legitimacy in the whole process. Although a few bits of information are exchanged in each message, the process converges quickly and eliminates unnecessary exposure effectively.

With reference to FIGS. 5A-5C, a number of different authentication protocols can be employed, three of which are presented here to demonstrate that this approach is flexible for different types of key-lock relations. The initialization processes for all relationships are the same. Shared secrets are delivered from verifying computing devices which embody locks via secure channels to claimant computing devices which house the master digital access key. In the exemplary embodiment, locks indicate the number of bits of the code words in the Bloom filter format.

Notation used to explain these protocols is as follows. L is a lock and M is the master digital access key. $R_x$ is a random number and $t_x$ is a timestamp used to form the time variant parameter TVP generated by X, the claimant computing device. $(\ )_{KX}^{-1}$ is X's signature using its signing private key. $BF_P(y, S)$ is a code word in a Bloom filter that P generates from a shared secret, S, and a TVP, y. $Hash_P(y, S)$ is a code word in the hash format that P generates from a shared secret, S, and a TVP, y. $MB_P$ is the last bit of a Bloom filter format code word that a party, P, finds the match.

FIG. 5A depicts the protocol for a unique key. A unique key is one that may be owned by one or a few owners to open a lock, for example, a car's remote keyless entry system. The claimant computing device initiates an authentication process by broadcasting an authentication message having an array of bits in a Bloom filter format along with a corresponding time variant parameter. The authentication message is used to discover potential locks. A lock replies only if it finds a match. In other words, the bits set in the array match a code word that is generated from a key held by the verifying computing device Upon receipt of an authentication message, a given verifying computing device will use the message to initiate the authentication process. When the array of bits in the authentication message match a key held by the verifying computing device, a reply message in transmitted from the verifying computing device to the claimant computing device. In an exemplary embodiment, the verifying computing device uses another hash algorithm to generate a code word. The reply message includes the hash value for the code word, the last bit of the code word, and a newly generated time variant parameter. In the exemplary embodiment, MD5 is used to hash the code words encoded in the Bloom filter format; whereas, SHA-1 is used to hash the code word in the reply message.

Lastly, the claimant computing device responds to the challenge presented by the verifying computing device. If the claimant computing device finds that hash value for the code word and the indicated last bit of the code word in the Bloom filter format are correct and match, it responds back with another hash format code word. It is possible that the claimant computing device may have several Bloom filter format code words that have the same last bit. However, comparison of the code words in the hash format will exclude the false positive cases.

If there are several key owners, they share the same secret with the lock. Usually, this type of key-lock relation is used for owners and locks without privacy concerns, and thus a 10-bit code word in the Bloom filter format may be used. However, if key owners have privacy concerns, they may use a code word with fewer bits. The protocol remains the same, while the number of bits of a code word changes. Alternatively, the individual key type may be used to address key owners' privacy concerns.

FIG. 5B depicts the protocol for a group key. A group key is one that a lock is able to authenticate as a key, but key owners are not differentiable. This means that all owners should have the same key. The same protocol as the unique key may be used, since the only difference between the group key and the unique may be the number of key owners. However, a key owner should only speak a 1-bit or 2-bit code word. A short code word ensures that a lock cannot differentiate among key owners. Because when there are two different code words of length 1 or 2 bits, it is very likely that the lock will find a false positive match and a true match in the first message. Thus, the key owner is able to tell that he has a different key than other owners when the lock replies with an incorrect code word in the hash format.

If the overhead caused by the false positive cases is large, a lock and its owners may use more bits for the code word in the Bloom filter format. However, the code word is preferably generated from some plain text as shown in FIG. 5B. The plain text in the message may be some human readable text such as "the CS department's mail room" or "XYZ Company's parking lot". The use of plain text instead of a secret changes the order of who first expresses knowledge of a secret. Since the lock expresses its knowledge first, the master digital access key knows that it shares the same secret as other key owners. If there is more than one secret, the lock may provide an incorrect code word in the second message. Moreover, the plain text is easy for key owners to verify that code words in the Bloom filter format are generated from some meaningful and reasonable text.

FIG. 5C depicts the protocol for an individual key. An individual key is one for which a specific key among a group can be identified, for example a badge for entering a factory. In other words, a key owner of the individual key can be identified among the group of key owners. A secret that the lock shares with a key owner is different from the secrets that it shares with other key owners. Thus, each key-lock pair has an individual secret. However, the individual secret is not used to generate the Bloom filter format of a code word in the first message. Since the master digital access key may specify many code words in the first message and a lock may have many key owners, many false positive cases may happen. To address such a situation, another domain secret is shared among all key owners and is used in the first message to identify the lock.

In the reply message, the lock proves its knowledge of the domain secret in a hash format. If the key owners are concerned that the reply message may come from another key owner who impersonates the lock, a digital signature may be used in place to counter the attack. In FIG. 5C, the lock signs the hash format code word. The lock also sends another Bloom filter in the reply message that encodes code words for every key owner. The code words are generated from the individual secrets. It is envisioned that the lock may set some random bits in the Bloom filter to hide the number of key owners that it has. In the responding message from the claimant computing device, the master digital access key indicates its identity by specifying the matched code word in the Bloom filter and proves its knowledge of the individual secret.

Revocation methods are different for the three key types. Invalidating the unique secret revokes a unique key. To revoke an individual key from a key owner, a lock invalidates the individual secret, while notification of a new domain secret to other key owners may not be imminent. However, to revoke a group key from a key owner, all other key owners need to update their group keys. If an owner updates his key when he finds that the key has expired, the lock system may be able to determine the owner's identity because he has just updated his key. Therefore, it is envisioned that a new group key can be dispatched to all key owners at the same time.

Performance measurement of the protocols show this approach is efficient. An insider recognizes a code word in the Bloom filter format, but whether the code word is from a true key owner is a probability, p(key owner|match) (because there are false positive cases). This probability may be calculated from $$p(\text{key owner} | \text{match}) = \frac{p(\text{match} | \text{key owner}) \times p(\text{key owner})}{p(\text{match} | \text{not key owner}) \times p(\text{not key owner}) + p(\text{match} | \text{key owner}) \times p(\text{key owner})}$$

where p(key owner) is the percentage of key owners among all people who send discovery messages at a place, and p(match|not key owner) is the false positive rate of a code word in the Bloom filter format. p(match|key owner) is one because there is no false negative case for code words in the Bloom filter format. The numerator and the denominator on the right side of equation 2 are p(key owner, match) and p(match), respectively.

Figure 6:
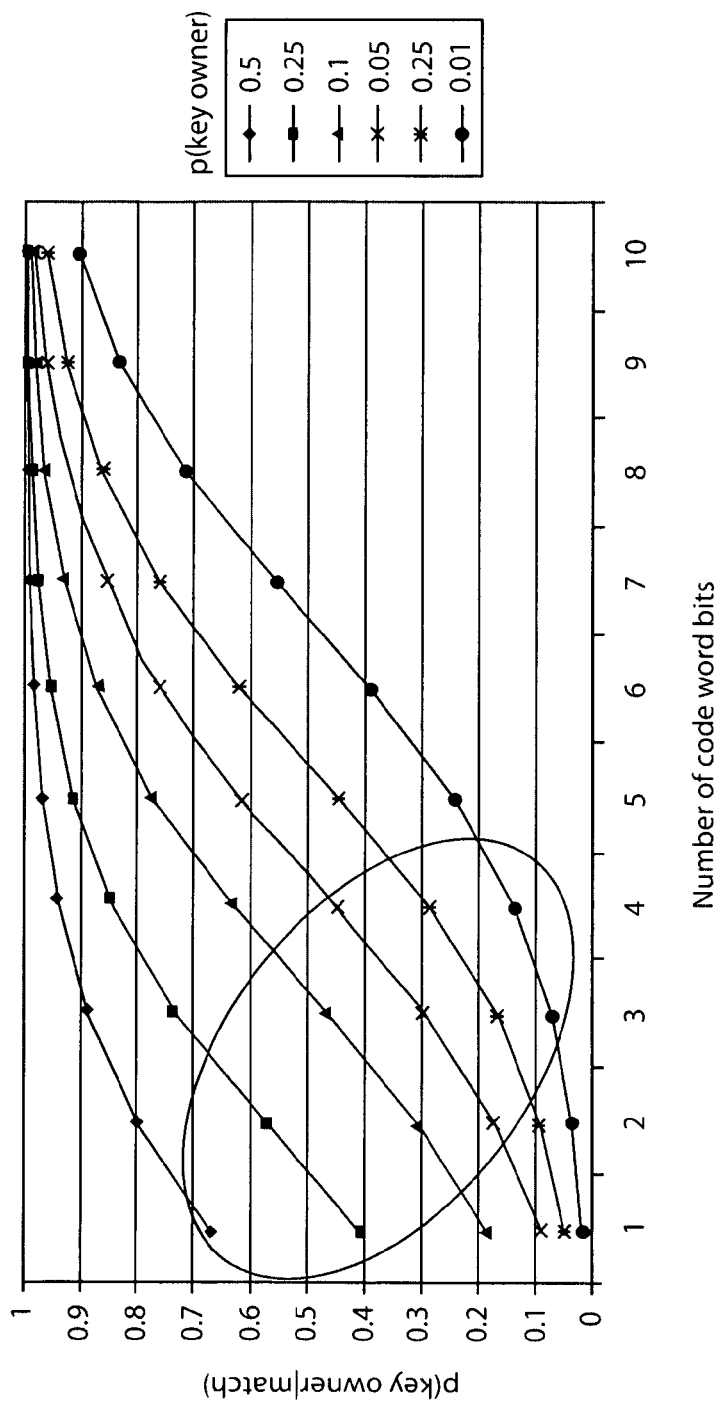
FIG. 6 a graphical representation illustrating the relation between the number of bits in a code word and the probability of a key owner match.

FIG. 6 illustrates the relation between the number of bits in a code word and p(key owner|match) for various p(key owner) values. The false positive rates, p(match|not key owner), are based on setting 50% of the bits in the Bloom filters. Note p(key owner|match) is for one lock at a place. Different locks may have different p(key owner|match) values at the same place.

The eclipse area in FIG. 6 shows the number of bits that a key-lock pair uses to protect privacy among insiders. A lock may count successful and unsuccessful protocol runs (unsuccessful runs include false positive matched and unmatched code words in Bloom filters that the lock hears), and then calculate p(key owner) over a period of time at its place. Nevertheless, at other places that no successful run happens, p(key owner) is unknown to insiders. An insider is uncertain when he finds a match in the Bloom filter format of a code word because the p(key owner|match) falls within a wide range. Even if p(key owner) is known, p(key owner|match) is a probability that is not significantly true.

The false positive overhead at the lock's side is 1—p(key owner| match). Thus, the overhead is high if few bits are used for a code word, while the overhead is low if more than a 10-bit code word is used. A lock may calculate p(key owner) over a period of time. If the overhead is a concern, it may notify its key owners to adjust the length of a code word. When a lock is not in the vicinity, the overhead at the master key side includes the calculation of a code word in the Bloom filter format and possibly the verification of the hash format code word in a false positive case.

The authentication protocols that we discussed so far are susceptible to the mafia fraud attack, as are many entity authentication protocols. Mafia fraud attacks may not have countermeasures by cryptography alone. Presently, there are several representative solutions to counter the attacks without physically isolating claimants (devices). First, location information may be integrated into an authentication protocol. Second, measuring the transmission time between a claimant and a verifier, and then one can determine whether the distance between the two is within the expectation. Improvements based on location and time information are also contemplated. Third, based on the assumption that an eavesdropper is not able to monitor all communication channels, a large number of channels are simultaneously used to obscure some real communication channels. These approaches can be adapted and fit into the protocols described above. For instance, if the master key and a lock know their location information, then the code words can be also based on the location information. Thus, an attack will be easily detected from the location information. Moreover, the master key and a lock may measure their upper distance bound. Instead of sending a code word in the hash format in one message, the master key and a lock may send a bit at a time over multiple rounds and determine whether their distance is reasonable.

Securing the claimant computing device that houses a master key is critical. Losing it may be as serious as losing a key chain and/or a wallet. Finger recognition and tamper-resistant features may reduce the problem. Handheld devices such as cell phones or PDAs are good candidates for implementing claimant computing devices. Locks embodied in verifying computing devices may have diverse processing and communication capabilities. Some may have limited processing powers, while others may support hundreds of key owners. Claimant computing devices and verifying computing devices may communicate over different types of communication links. While a wireless communication link is preferred, physical contact or wired communication links are also contemplated by this disclose.

In this disclose, a master key approach was proposed for entity authentication in pervasive computing environments. The approach improves usability such that a person carries one device for various authentication purposes while it maintains the favorable properties of carrying multiple access tokens. The master key exchanges code words with locks securely and privately. Sensitive information, including identities and presence information, is protected from malicious outsiders via encryption and from malicious insiders via a probabilistic approach. The above description is merely exemplary in nature and is not intended to limit the present disclosure, application, or uses.

What is claimed is:

1. A method for authenticating an entity having a plurality of keys in a digital form residing on a claimant computing device, comprising:
generating, by the claimant computing device, a first code word using a first key residing on the claimant computing device;
encoding, by the claimant computing device, the first code word into an array of bits;
generating, by the claimant computing device, a second code word using a second key residing on the claimant computing device, where the first key and the second key are operable with different verifying computing devices;
encoding, by the claimant computing device, the second code word into the array of bits;
broadcasting, by the claimant computing device, an authentication message having the array of bits therein from the claimant computing device;
receiving, by a given verifying computing device, the authentication message;
authenticating, the verifying computing device, the identity of the claimant computing device using the authentication message received by the verifying computing device;
transmitting a reply message, from the verifying computing device, to the claimant computing device when bits set in the array of bits in the authentication message match a key held by the verifying computing device;
receiving, by the claimant computing device, a reply message in response to the authentication message from a verifying computing device, the reply message having at least one of the first key and the second key and datum for an authentication challenge; and
transmitting, by the claimant computing device, another authentication message to the verifying computing device in response to receipt of the reply message.

2. The method of claim 1 further comprises generating a first code word by appending the first key with a time-variant parameter.

3. The method of claim 1 further comprises generating a first code word by applying a hash function to the first key.

4. The method of claim 1 further comprises encoding the first code word in an array of bits having a Bloom filter format.

5. The method of claim 1 further comprises defining the first code word and the second code word as having different number of bits.

6. The method of claim 1 further comprises encoding a portion of bits which form the first code word into the array and encoding all of the bits which form the second code word into the array.

7. The method of claim 1 further comprises receiving a reply message from the verifying computing device when a codeword in the array of bits matches a codeword generated from a shared key held by the verifying computing device.

8. The method of claim 7 further comprises transmitting a reply message having a code word derived from the matched key.

9. The method of claim 7 further comprises transmitting another code word derived from the matched key from the claimant computing device to the given verifying computing device.

10. A method for authenticating an entity having a plurality of keys in a digital form residing on a claimant computing device, comprising:
generating a first code word by applying a hash function to a first key residing on the claimant computing device;
encoding the first code word into an array of bits having a Bloom filter format;
generating a second code word by applying a hash function to a second key residing on the claimant computing device;
encoding the second code word into the array of bits;
broadcasting, by the claimant computing device, an authentication message having the array of bits therein;
receiving, by a given verifying computing device, the authentication message;
authenticating, the verifying computing device, the identity of the claimant computing device using the authentication message received by the verifying computing device;
transmitting a reply message, from the verifying computing device, to the claimant computing device when bits set in the array of bits in the authentication message match a key held by the verifying computing device;
receiving the reply message at the claimant computing device, the reply message having datum for an authentication challenge;
generating, by the claimant computing device, another codeword using the datum in the reply message; and
transmitting, by the claimant computing device, another authentication message, including the another codeword, to the verifying computing device.

11. The method of claim 10 further comprises generating a first code word by appending the first key with a time-variant parameter prior to applying the hash function.

12. The method of claim 10 further comprises defining the first code word as having a different number of bits than the second code word.

13. The method of claim 12 further comprises mixing random bits with at least one of the first code word or second code word to achieve a fixed ratio of bits set in the array and total number of bits in the array.

14. The method of claim 10 further comprises encoding a portion of bits which form the first code word into the array and encoding all of the bits which form the second code word into the array.

15. The method of claim 10 further comprises transmitting the reply message with a code word derived by applying a hash function to the matched key.

16. The method of claim 15 further comprises transmitting the reply message with a last bit of the code word that matched the key held by the verifying computing device.

17. The method of claim 16 further comprises transmitting the reply message with a time variant parameter newly generated by the verifying computing device.

18. The method of claim 17 further comprises:
receiving the reply message at the claimant computing device;
authenticating the identity of the verifying computing device using the reply message received at the claimant computing device; and
transmitting a message with a code word derived from the matched key from the claimant computing device to the verifying computing device.

19. A method for authenticating an entity having a plurality of keys in a digital form residing on a claimant computing device, comprising:

generating a first token using a first key residing on the claimant computing device;

encoding the first token into an array of bits having a Bloom filter format;

generating a second token using a second key residing on the claimant computing device, where the first key and the second key are operable with different verifying computing devices;

encoding the second token into the array of bits;

broadcasting, by the claimant computing device, an authentication message having the array of bits therein from the claimant computing device;

receiving, by a given verifying computing device, the authentication message;

authenticating, the verifying computing device, the identity of the claimant computing device using the authentication message received by the verifying computing device;

transmitting a reply message, from the verifying computing device, to the claimant computing device when bits set in the array of bits in the authentication message match a key held by the verifying computing device;

receiving a reply message in response to the authentication message from the verifying computing device, the reply message having at least one of the first key and the second key, the reply message having datum for an authentication challenge; and transmitting another authentication message from the claimant computing device to the verifying computing device in response to receipt of the reply message, the another authentication message including a code word derived from the datum from the reply message.

\* \* \* \* \*